July 23, 1963     J. PAINE     3,098,668

STREET LIGHT BRACKET CONNECTION MEANS

Filed Feb. 27, 1961

INVENTOR.
Jordan Paine
BY Scott Nowiel
atty

United States Patent Office 3,098,668
Patented July 23, 1963

3,098,668
STREET LIGHT BRACKET CONNECTION MEANS
Jordan Paine, 208 S. 55th Ave., P.O. Box 14427,
Phoenix 31, Ariz.
Filed Feb. 27, 1961, Ser. No. 91,927
1 Claim. (Cl. 287—56)

This invention concerns an improved street light bracket connection means.

It is to be understood that this device, more particularly, covers a connection means to attach a street light bracket to a street light pole. According to the common practice street light poles are now made of steel tubing and the brackets are also made of steel tubing. Some difficulty has been experienced in connecting the bracket to the pole so that a minimum number of parts may be used and so that the parts as applied may be easily replaced and so that additional fittings are unnecessary to hold the conductor cables that usually are included in the bracket.

One of the objects is to provide a strong, safe detachable bracket for street lamps which may be secured to the top of a street light pole using a minimum number of attaching parts and arranged so that the conductor cord may be included in the bracket after it is attached and without additional parts.

Another object is to provide a replaceable bracket for attachment to the tops of tubular steel street light poles which has a minimum number of parts and which may be applied by common tools used by workmen on this type of installation.

Still another object is to provide a bracket attachment which is weather proof and will protect the electrical wiring and at the same time provide a means for bracing the bracket and the pole, if desired.

Other objects will appear hereinafter.

I attain the foregoing objects by means of the parts, combinations of parts and devices shown in the accompanying drawings, in which—

Similar numerals refer to similar parts in the several views.

Figure 1:
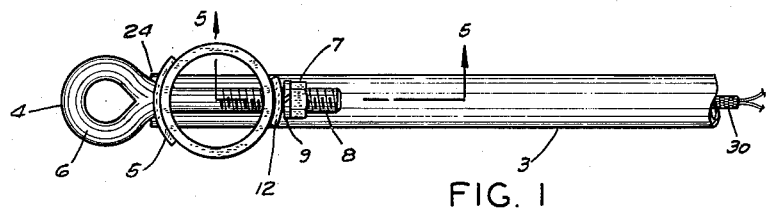
FIGURE 1 is a top plan view of a street lamp pole with a light bracket in place.
Figures 2, 3:
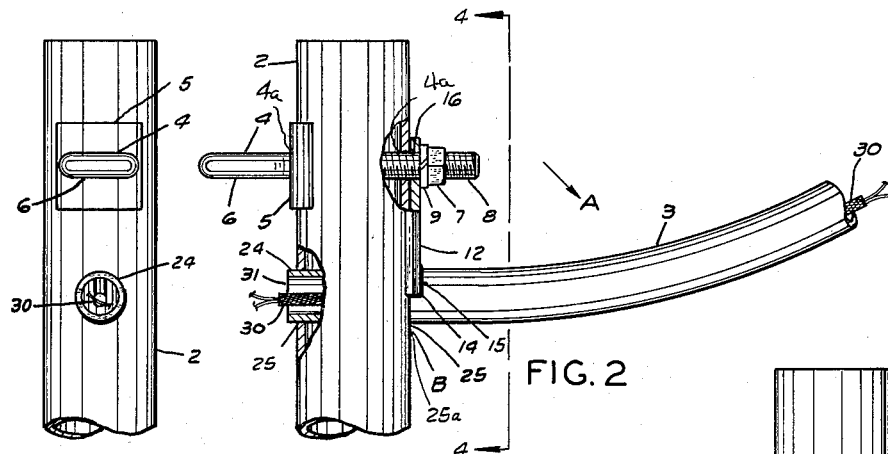
FIGURE 2 is a side elevational view thereof.
FIGURE 3 is a rear elevational view thereof.
Figures 4, 5:
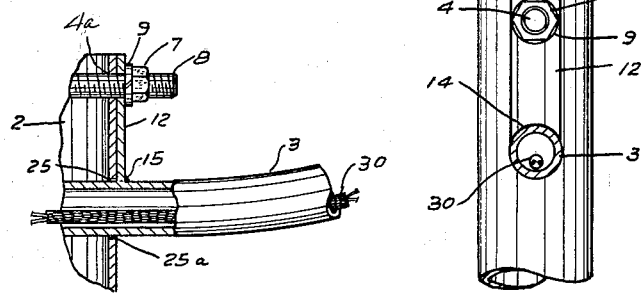
FIGURE 4 is a front elevational view thereof taken substantially on line 4—4 of FIGURE 2.
FIGURE 5 is a section of the bracket and the adjacent pole taken substantially on line 5—5 of FIGURE 1.

In the drawings, numeral 2 indicates the top portion of a tubular light supporting pole. 3 indicates the bracket in general. Numeral 4 indicates an eye bolt extending through holes 4a in the top of the pole and extending fore and aft, and having a curved strengthening piece 5, having its inner surface conforming to the outer surface of the pole 2 and disposed adjacent to its eye 6 and a nut 7 at the forward outer part of said bolt is screwed onto the bolt threads 8 and a split spring washer 9 bearing against the outer face of the upright connecting piece 12. It is to be noted that the rear end 24 of the bracket 3 is inserted through horizontally positioned holes 25, in which it has a sliding fit, and drilled through the upper part 2 of the pole. As a rule the upper tubular part of the pole is approximately four inches in diameter and the bracket is made of approximately 1¼ inch steel tubing. This provides sufficient strength to hold the bracket out firmly against all ordinary vibration and strains which may be caused by the weight of the light at the end of the bracket or wind disturbances.

The connecting piece 12 has a section which is curved so that its inner face conforms to the outer surface of the pole part 2 and it has a lower end which is cut out to conform to the outer surface of the bracket 3 at the point of attachment. The cut-out lower portion 14 is then welded as at 15 to the outer surface of the upper face of the bracket 3. The piece then extends vertically from the weld 15 on surface of the bracket 3 and contacts the outer annular surface of the pole 2. At its upper end it is provided with a hole 16 to receive the outer end 8 of the bolt 4.

When the nut 7 is tightened the washer 9 holds the bracket against all downward strains in the direction of the arrow marked "A." Some of the weight of the bracket is carried by the lower edge "B" of the hole 25 which goes through the top of the pole 2. In this way the inner or butt end of the bracket 3 is firmly attached to the upper end of the pole 2 because the hole 25 can be made an easy slip fit. When nut 7 applies pressure to the connecting piece 12 downward movement is stopped and at the same time a certain amount of the weight of the bracket is held on bolt 8 and a further portion of the weight of the bracket may be held on the edge 25a of the forward end of hole 25 which is drilled diametrically through the top of the pole.

All these holding points maintain the bracket in a firm horizontal position and resist upward and downward motion as well as any twisting motion that may be applied to it.

By the use of the curved plate 5, an ordinary type of eye bolt may be used and pressure applied to the bolt is accordingly spread over a large area of the back side of pole 2. Note that the edge "B" may act somewhat as a fulcrum on which the lower face of the bracket 3 rests while it is held at the other points, as above explained.

Note that the electric cable 30 extends through the bracket. This is made possible because the rear end 31 of the bracket is open and exposed. Therefore, no other fitting is necessary to hold the wiring and any joints it may have with the feed line. In this way an extra fitting, attached to the body of the pole 2, is unnecessary and also a long hole to let the wiring out to the side of the bracket is unnecessary.

After the bracket is applied to the pole it may be removed merely by loosening and removing nut 7 and pulling out eye bolt 4. The cable 30 will come with the bracket and need not be separately removed.

I claim:

A detachable light bracket attachment for a tubular light pole wherein said pole has an upper pair of horizontal opposing holes aligned along a horizontal axis from front to rear and a lower pair of horizontal opposing holes similarly aligned, said bracket attachment comprising an elongated tubular body adapted to enclose an electric supply cable and having its rearward end inserted rearwardly through said lower pair of holes in said hole extending outwardly from said hole as a cantilever beam, an elongated suspension plate extending substantially perpendicular and upward from said tubular body adjacent the front face of said pole, said elongated plate having an arcuate cutout at its lower end partially encircling said tubular body and rigidly fixed thereto, said plate having a curved inner face to conform to the front face of said pole so as to prevent radial movement of said body relative to the pole, said plate having a bolt hole at its upper end, a bolt passing through said upper bolt holes in said pole and said bolt hole in said plate, a strengthening piece between said bolt and the rear face of said pole, a nut threaded onto said bolt and adapted to secure said plate to said pole and thereby secure said body to said pole, said bolt acting to at least partially support said plate and thereby at least partially support said tubular body at said lower front hole in said pole, said tubular body being unsupported at any point outside the immediate area of said pole and said bracket including said plate and tubular body being retained in assembled position on said pole by only said bolt.

References Cited in the file of this patent

UNITED STATES PATENTS

| | | |
|---|---|---|
| 358,392 | Grove | Feb. 22, 1887 |
| 1,767,585 | Hebendahl | June 24, 1930 |
| 1,857,314 | Markman | May 10, 1932 |